(12) United States Patent
Tang et al.

(10) Patent No.: US 7,456,475 B2
(45) Date of Patent: Nov. 25, 2008

(54) DISPLAY PANEL

(75) Inventors: Pao-Yun Tang, Taoyuan Hsien (TW);
Po-Yang Chen, Tao-Yuan Hsien (TW)

(73) Assignee: Hannstar Display Corp., Tao-Yuan Hsien (TW)

( * ) Notice: Subject to any disclaimer, the term of this patent is extended or adjusted under 35 U.S.C. 154(b) by 7 days.

(21) Appl. No.: 11/553,543

(22) Filed: Oct. 27, 2006

(65) Prior Publication Data
US 2008/0099763 A1    May 1, 2008

(51) Int. Cl.
*H01L 27/12* (2006.01)
(52) U.S. Cl. .................. 257/347; 257/E27.111
(58) Field of Classification Search .......... 257/49, 257/52, 57, 59, 213, 288, 347, E27.111
See application file for complete search history.

(56) References Cited

U.S. PATENT DOCUMENTS 5,414,283 A * 5/1995 den Boer et al. ............. 257/59
2002/0047972 A1* 4/2002 Kim et al. ................... 349/141
2003/0117536 A1* 6/2003 Jeon ............................ 349/40
2004/0041956 A1* 3/2004 Hwang ........................ 349/43
2004/0070333 A1* 4/2004 Lin et al. ..................... 313/500

* cited by examiner

*Primary Examiner*—Evan Pert
*Assistant Examiner*—Kevin Quinto
(74) *Attorney, Agent, or Firm*—Thomas, Kayden, Horstemeyer & Risley (57) ABSTRACT

The invention discloses a display panel. A substrate comprising a chip bonding region and a cut cross-section is provided. A first conductive layer is disposed on the chip bonding region. An insulating layer is disposed on the substrate between the first conductive layer and the cut cross-section, covering a sidewall of the first conductive layer. A second conductive layer is disposed on the insulating layer extending until the cut cross-section and electrically connected to the first conductive layer.

19 Claims, 14 Drawing Sheets

DISPLAY PANEL

BACKGROUND OF THE INVENTION

1. Field of the Invention

The invention relates to a display panel and in particular to a display panel with corrosion protection.

2. Description of the Related Art

Flat panel display devices commonly use LCD panels. An LCD panel may include a pixel region having an array of pixel thin film transistors and intersecting arrays of spaced data lines and gate lines connected to the array of pixel thin film transistors. The array of pixel thin film transistors, data lines and gate lines form an array of addressable pixels. The LCD panel may also include a peripheral region associated with driver integrated circuit chips (ICs), which drive the array of pixel thin film transistors. The ICs may be mounted to the LCD panel in the peripheral region thereof using a chip-on-glass (COG), tape-carrier-package (TCP) or chip-on-film (COF) technology. In COG, TCP and COF, anisotropic conductive films (ACFs) bond the driver ICs or the flexible printed circuits or other films which carry driver ICs to the LCD panel.

Figure 1:
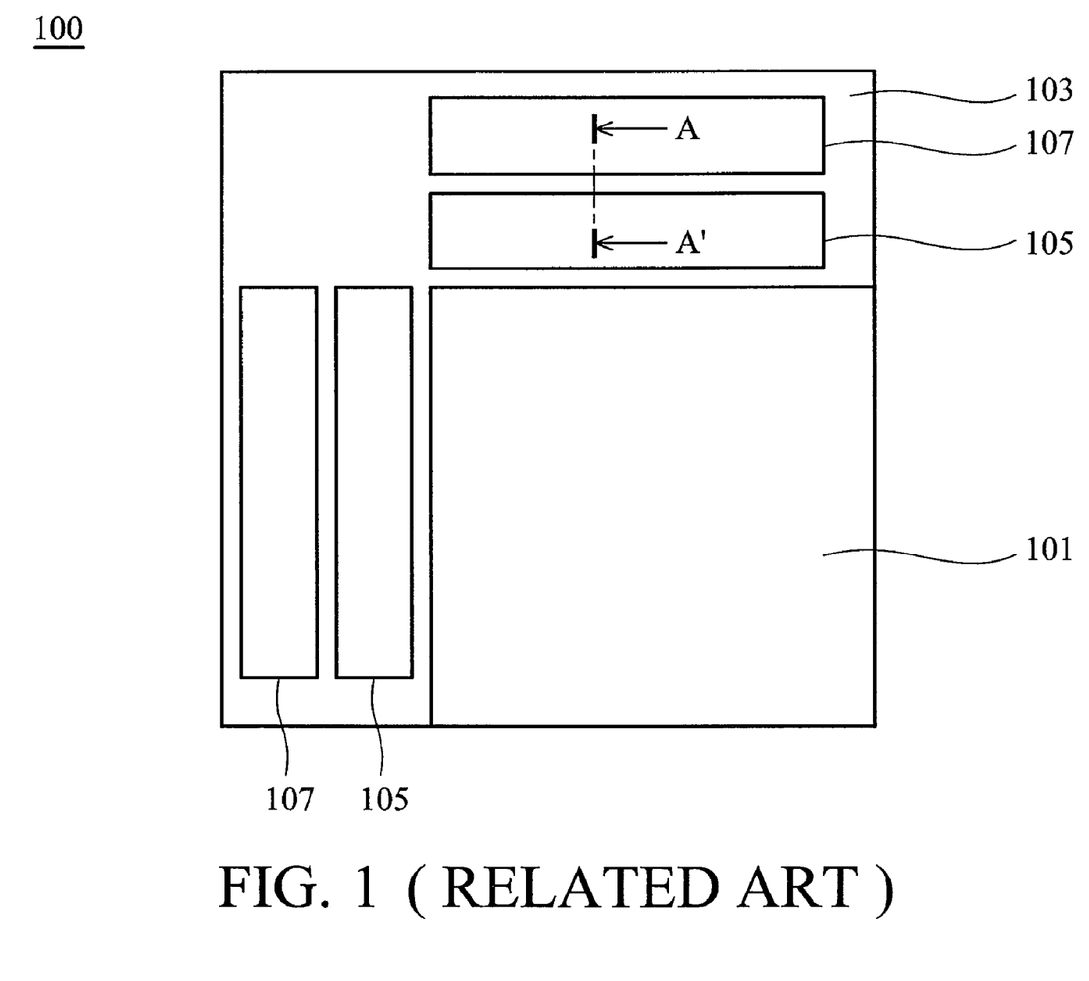
FIG. 1 is a plane view of a traditional LCD panel with chip-on-class (COG) bonded driver integrated circuit chips (ICs)

FIG. 1 is a plane view of a traditional LCD panel 100. The panel 100 includes a pixel region 101 and a peripheral region 103, which comprises a chip bonding region 105 with a plurality of chip bonding pads (not shown), and fringe circuit 107 with a plurality of test pads (not shown). The pixel region 101 has a pixel thin film transistor (TFT) array with conductive gate and data lines (not shown).

The fringe circuit region 107 serves as a signal receiver during array testing, or is connected to an ESD (electrostatics discharge) circuit, providing electrostatic protection. The fringe circuit is provided adjacent to a chip bonding region 105 of the LCD panel. The fringe circuit is electrically connected to a group of terminal pads disposed on the surface of the LCD panel, which are electrically connected to the integrated circuits (ICs) with anisotropic conductive film bonds.

Figure 2A:
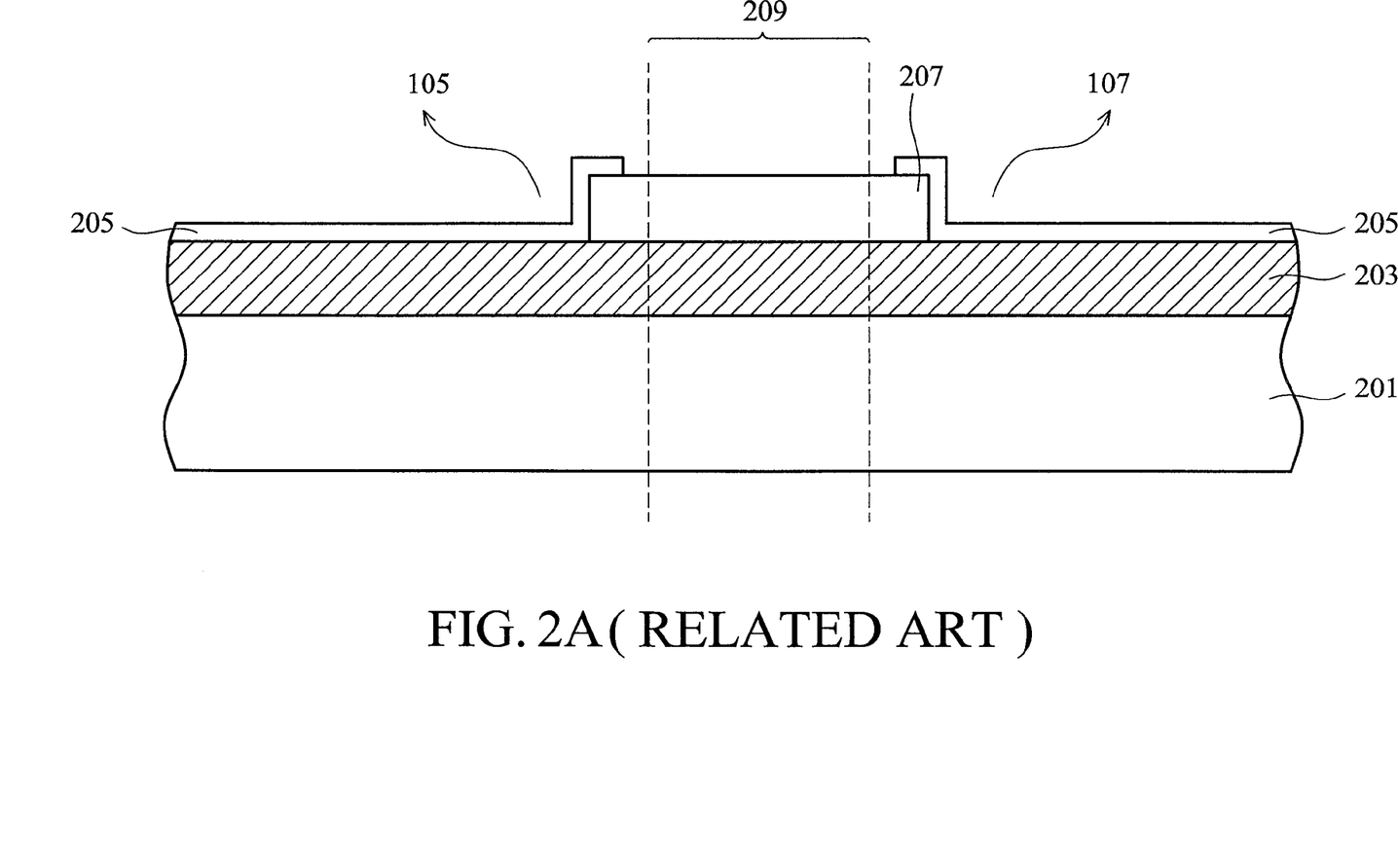
FIG. 2A is a cross-section of the peripheral region of a traditional LCD panel along the line A-A' of FIG. 1.
Figure 2B:
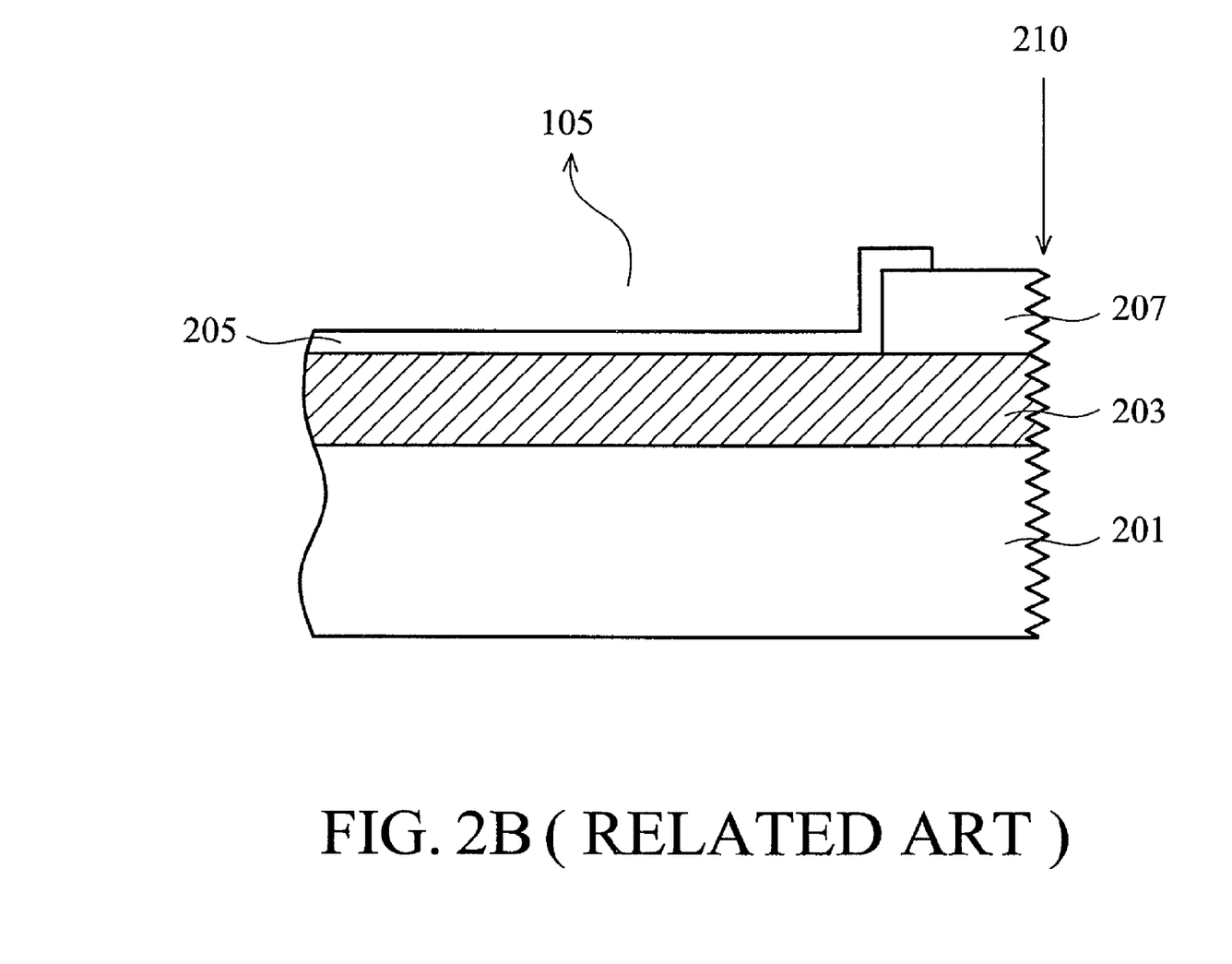
FIG. 2B is a cross-section of the peripheral region of a traditional LCD panel after removal of the fringe circuit region by cutting.

FIG. 2A is a cross-section diagram of the peripheral region 103 of the traditional LCD panel 100 along the dash line A-A'. As shown in FIG. 2A, the peripheral region 103 comprises a substrate 201 having a chip bonding region 105 and a fringe circuit region 107, and a conductive layer 203 disposed thereon. The chip bonding region 105 is separated apart from the fringe circuit region 107 by an insulating layer 207. A conductive layer 205 is formed covering the conductive layer 203 and part of the top surfaces of the insulating layer 207, exposing a cut region 209 of the insulating layer 207. The fringe circuit region is used to receive the driving signals during the array test or protect the electrostatics discharge damage during the manufacturing process. After a cell process, the fringe circuit region 107 is removed by cutting through the cut region 209 within the insulating layer 207, exposing the sidewall of the conductive layer 203 to the air, as shown in FIG. 2B, such that the exposed sidewall 210 of the conductive layer 203 is corroded. The corrosion extends to the bonding pads through the conductive layer resulting in failure of signal transmission

BRIEF SUMMARY OF THE INVENTION

The invention provides a display panel comprising an insulating layer to protect the sidewall of the conductive layer from corrosion after cutting.

In one embodiment, a display panel comprises a substrate comprising a chip bonding region and a cut cross-section; an insulating layer on the substrate between the first and the second conductive layer and the cut cross-section, covering a sidewall of the first conductive layer; and a second conductive layer disposed on the insulating layer extending until the cut cross-section and electrically connected to the first conductive layer.

In another embodiment, the display panel comprises a substrate comprising a chip bonding region, a fringe circuit region and a cut cross-section; a first conductive layer on the chip bonding region; a second conductive layer on the fringe circuit region, wherein the first and the second conductive layer have opposite sidewalls; a first insulating layer on the substrate, between the first and the second conductive layer and covering the opposite sidewalls; a second insulating layer disposed on the second conductive layer, spaced from the first insulating layer; and a third conductive layer disposed on the first and the second insulating layers extending until the cut cross-section and electrically connected the first and the second conductive layers.

In yet another embodiment, the display panel comprises a substrate comprising a chip bonding region and a cut cross-section; a first conductive layer on the chip bonding region; a first insulating layer on the substrate, between the first conductive layer and the cut cross-section, covering a sidewall of the first conductive layer; a second conductive layer on the first insulating layer; a second insulating layer covering the second conductive layer, with an opening exposing a top surface thereof, and a third conductive layer disposed on the second insulating layer extending until the cut cross-section and electrically connecting the first and second conductive layers.

In addition, the display panel further comprises a fringe circuit region on the substrate; a fourth conductive layer on the fringe circuit region, between the first insulating layer and the cut cross-section; a third insulating layer disposed on the fourth conductive layer extending until the cut cross-section; and the third conductive layer disposed on the third insulating layer extending until the cut cross-section and electrically connecting the first, second and third conductive layers.

A detailed description is given in the following with reference to the accompanying drawing.

BRIEF DESCRIPTION OF THE DRAWINGS

The invention can be more fully understood by reading the subsequent detailed description and examples with references made to the accompanying drawings, wherein.

DETAILED DESCRIPTION OF INVENTION

The invention provides a display panel having an insulating layer to protect the sidewall of the conductive layer from corroding after cutting.

Reference will now be made in detail to preferred embodiments, examples of which are illustrated in the accompanying drawings.

Figure 3:
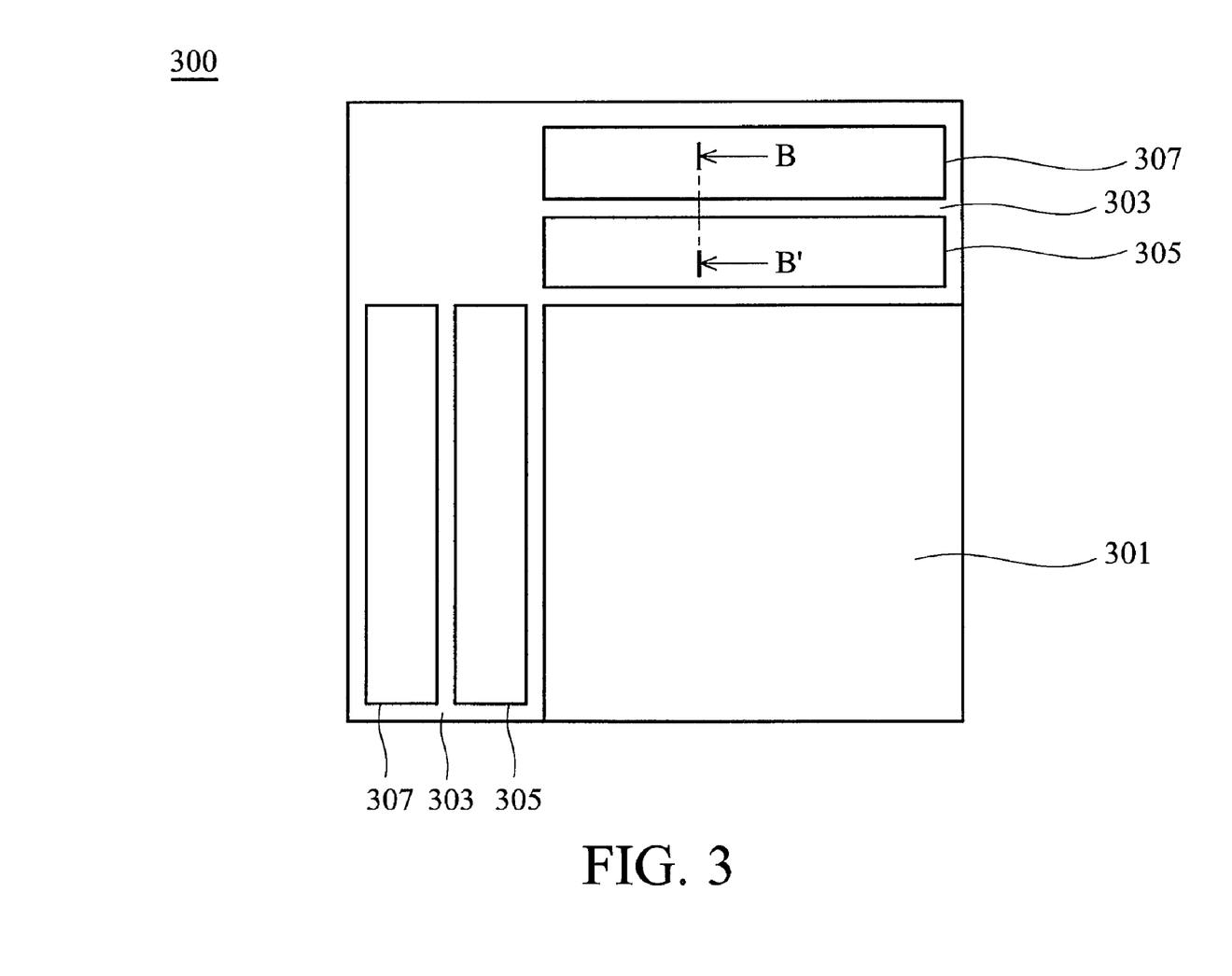
FIG. 3 is a plane view of a LCD panel of the invention with chip-on-class (COG) bonded driver integrated circuit chips (ICs)

FIG. 3 is a plane view of a LCD panel 300 of the invention. The panel 300 comprises a pixel region 301 and a peripheral region 303, wherein the peripheral region 303 comprises a chip bonding region 305 and fringe circuit region 307 next to the chip bonding region. The pixel region 301 has a pixel thin film transistor array (TFT) with conductive gate and data lines (not shown).

Figure 4A:
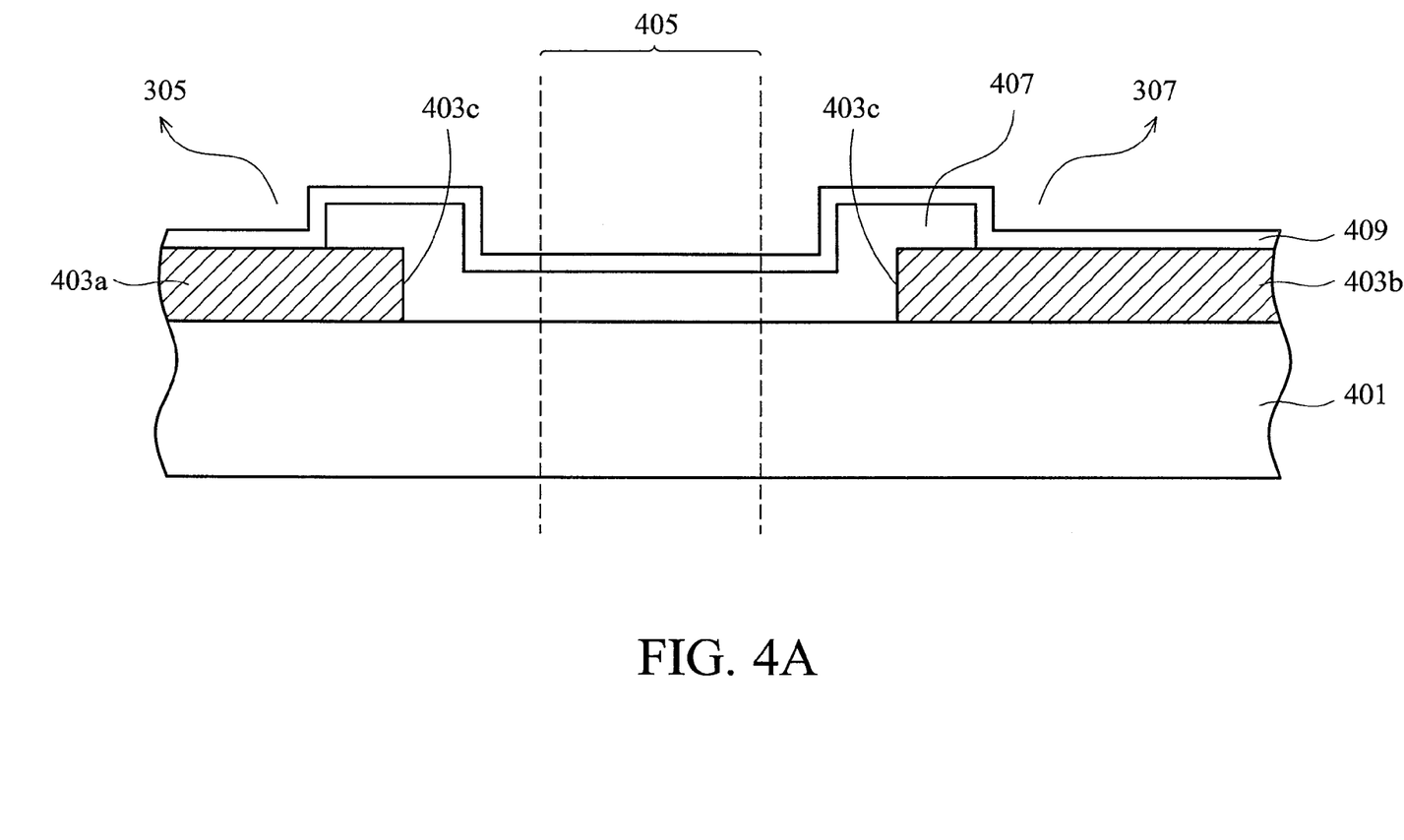
FIG. 4A is a cross-section of the peripheral region of the LCD panel of FIG. 3.
Figure 4B:
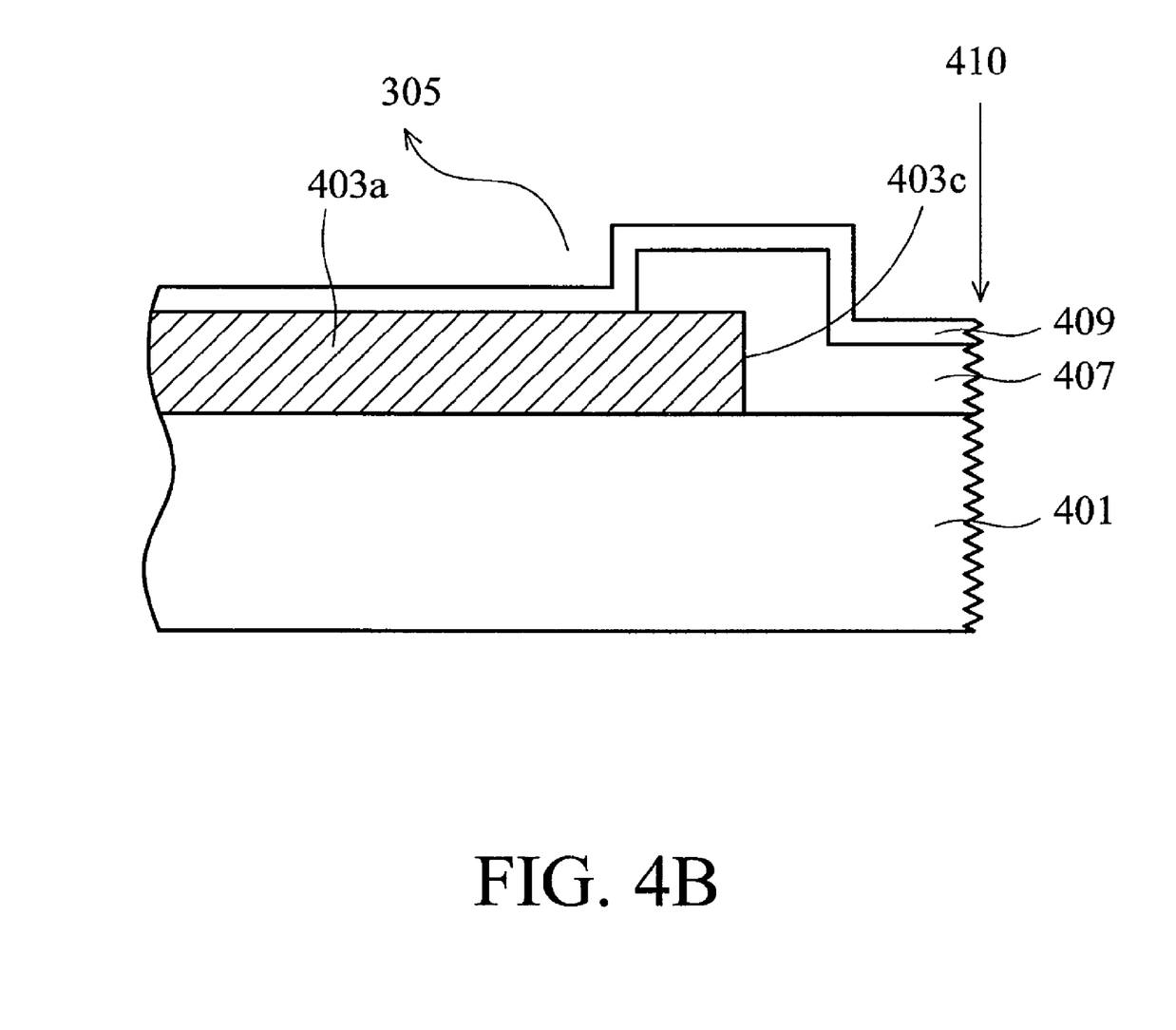
FIG. 4B is a cross-section of the peripheral region of the LCD panel after removal of the fringe circuit region by cutting.

FIG. 4A is a cross-section of a peripheral region 303 of the LCD panel 300 along the dash line B-B'. As shown in FIG. 4A, the peripheral region 303 comprises a substrate 401, such as glass substrate, having a chip bonding region 305 and a fringe circuit region 307. Conductive layers 403a and 403b having opposite sidewalls 403c are disposed on the chip bonding region and the fringe circuit region respectively. Conductive layer 403a and 403b may be metal, such as Mo, Ti, Cr, W, Al, AlNd, MoW or like. An insulating layer 407 is formed on the substrate 401 between the conductive layer 403a and 403b, covering the opposite sidewalls 403c thereof. The insulating layer 407 may be but is not limited to oxide or nitride. As shown in FIG. 4A, the insulating layer 407 preferably covers part of the top surface of the conductive layer 403a and 403b, providing complete protection of the sidewall 403c of the conductive layer 403a and 403b. A conductive layer 409 is formed on the conductive layer 403a, the insulating layer 407 and the conductive layer 403b, electrically connecting the chip bonding region 305 and fringe circuit region 307. The conductive layer 409 may be a transparent conductive layer, such as ITO, IZO, AZO, or CTO. Overlying the chip bonding region 305 further comprises a chip bonding pad and IC chip thereon (not shown). After cell process, the fringe circuit region 307 is removed by cutting through the cut region 405 within the insulating layer 407 between the opposite sidewalls 403c. A cross-section of the LCD panel 300 after cutting is shown in FIG. 4B, wherein a cut cross-section 410 is produced along the boundary of the cut region 405 of FIG. 4A. Compared to the traditional display panel shown in FIGS. 2A and 2B, the sidewall 403c of the conductive layer 403a is protected by the insulating layer 407, such that the sidewall 403c of the conductive layer 403a is not exposed and corroded after cutting, as shown in FIG. 4B. In this embodiment, the electrical connection between the chip bonding region 305 and the fringe circuit region 307 accomplished by the conductive layer 409.

Figure 5A:
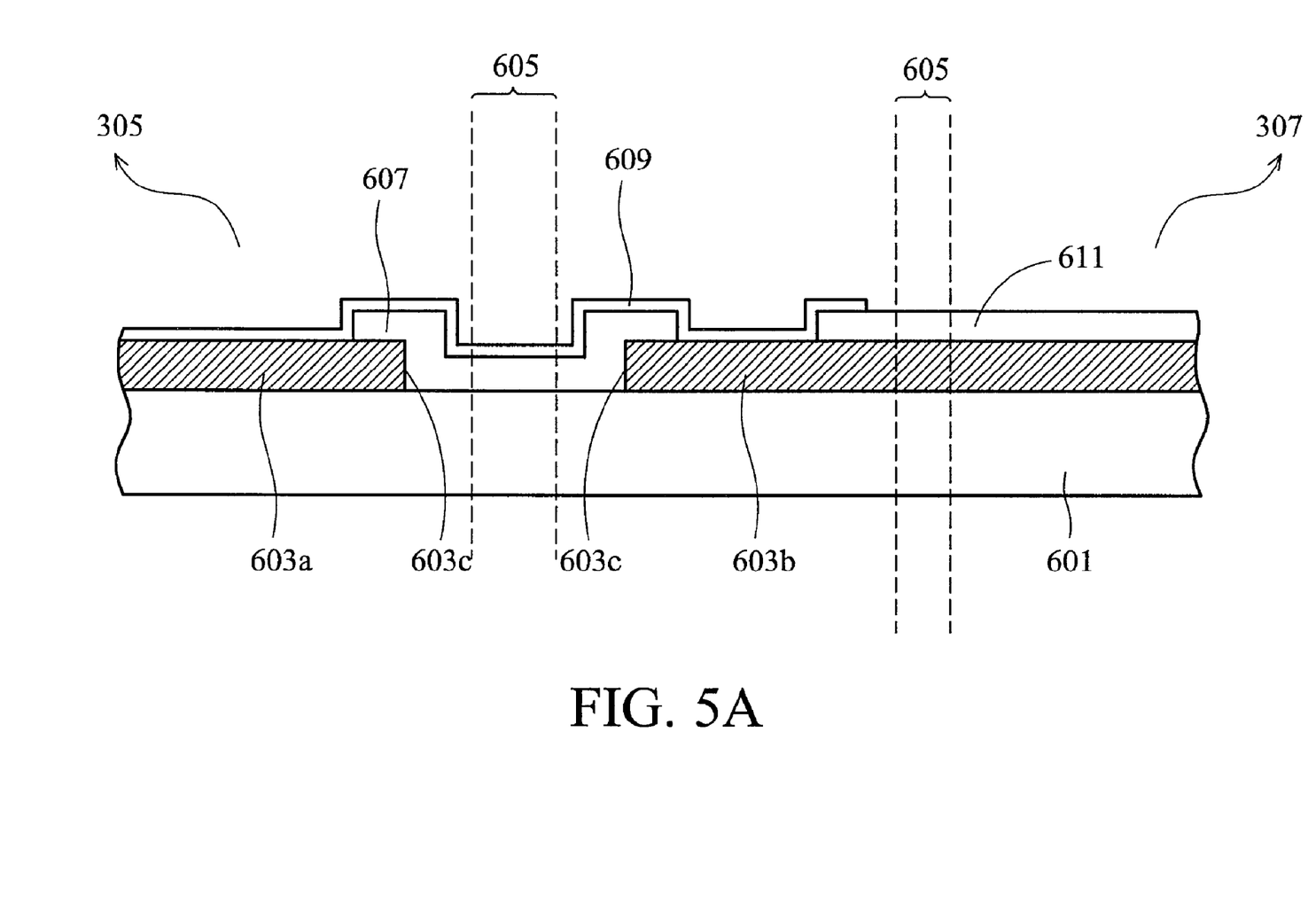
FIG. 5A is a cross-section of a peripheral region according to one embodiment of the invention.

FIG. 5A shows a cross-section of the peripheral region 303 according to another embodiment of the invention. As shown in FIG. 5A, the peripheral region 303 comprises a substrate 601 having a chip bonding region 305 and a fringe circuit region 307. Conductive layer 603a and 603b having opposite sidewalls 603c are disposed on the chip bonding region 305 and fringe circuit region 307 respectively. The conductive layer 603a and 603b may be metal, such as Mo, Ti, Cr, W, Al, AlNd, MoW or like. An insulating layer 607 is formed on the substrate 601 between the conductive layer 603a and 603b and covers the opposite sidewalls 603c thereof. The insulating layer 607 may be oxide or nitride. Referring to FIG. 5A, the insulating layer 607 preferably covers part of the top surfaces of the conductive layers 603a and 603b. An insulating layer 611 is disposed on the conductive layer 603b, spaced from the insulating layer 607. The insulating layer 611 and 607 may be the same or different materials. A conductive layer 609 is formed to cover the conductive layer 603a, the insulating layer 607 and part of the insulating layer 611, electrically connecting the chip bonding region 305 and the fringe circuit region 307. The conductive layer 609 may be a transparent conductive material, such as ITO, IZO, AZO, or CTO. In this embodiment, the cut region 605 may be within the insulating layer 607 between the opposite sidewalls 603c or, alternatively, within the insulating layer 611. After cell process, the fringe circuit region 307 is removed by cutting through the cut region 605 within the insulating layer 607 or the insulating layer 611, and the insulating layer 607 protects the conductive layer 603a from corrosion.

Figure 5B:
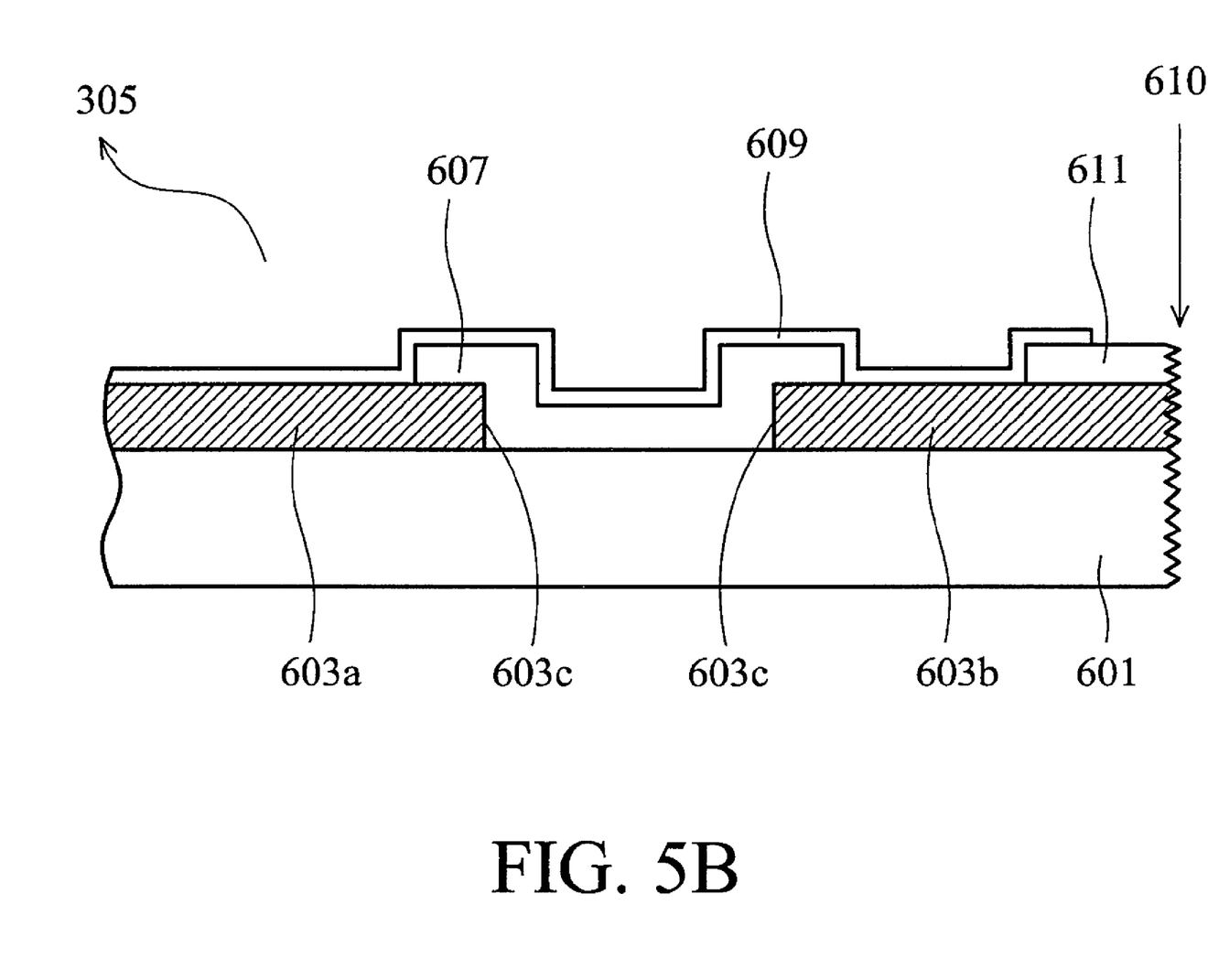
FIG. 5B is a cross-section of a peripheral region according to FIG. 5A after removal part of the fringe circuit region by cutting at one position.
Figure 5C:
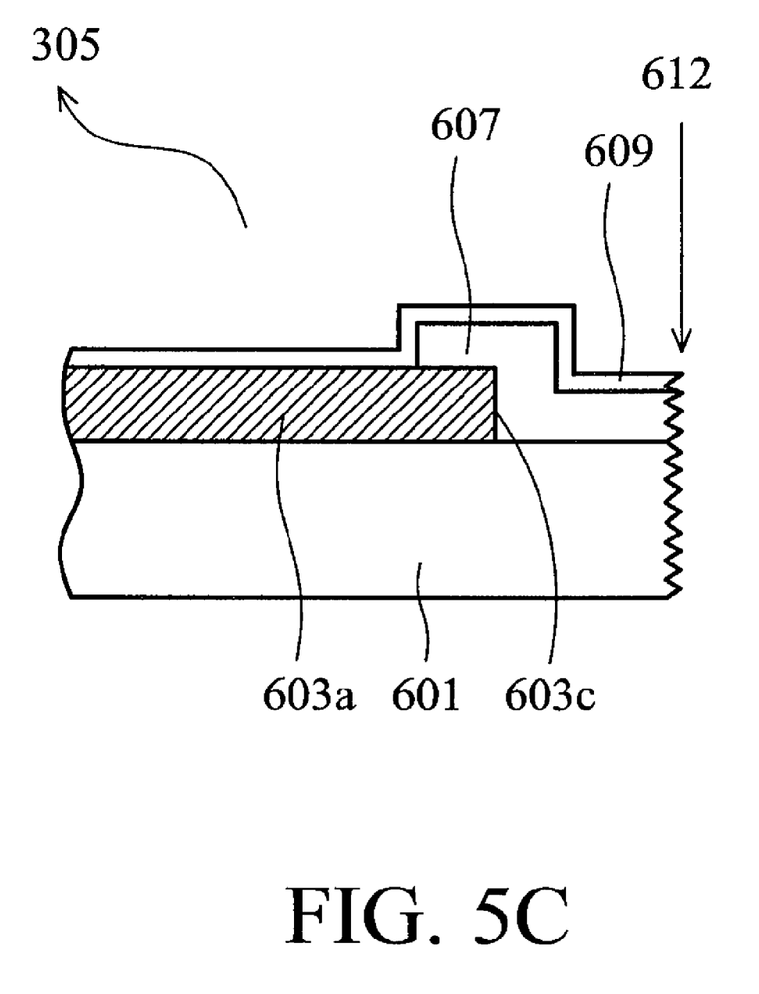
FIG. 5C is a cross-section of a peripheral region according to FIG. 5A after removal part of the fringe circuit region by cutting at the other position.

FIG. 5B shows the resulting structure when the cutting is conducted on the cut region 605 within the insulating layer 611. As shown in FIG. 5B, a cut cross-section 610 produced is along the boundary of the cut region 605 of FIG. 5A. The insulating layer 607 prevents the corrosion from extending to the conductive layer 603a, whereby the corrosion only happens within the conductive layer 603b. FIG. 5C shows the resulting structure when the cutting is conducted on the cut region 605 within the insulating layer 607. As shown in FIG. 5C, a cut cross-section 612 produced is along the boundary of the cut region 605 of FIG. 5A. The insulating layer 607 prevents the corrosion from extending to the conductive layer 603a.

Figure 6A:
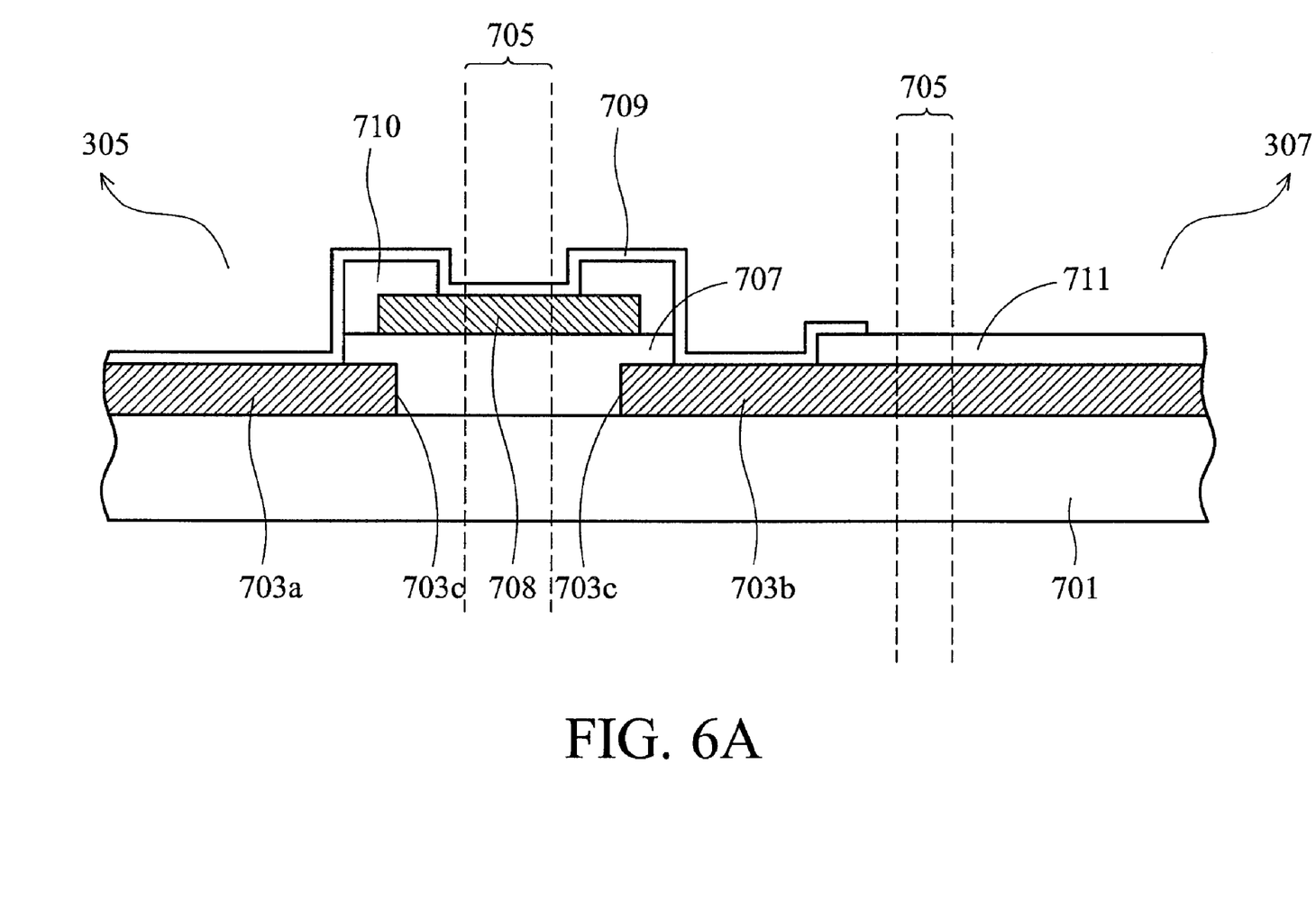
FIG. 6A is a cross-section of a peripheral region according to another embodiment of the invention.

FIG. 6A shows a cross-section of the peripheral region 303 according to another embodiment of the invention. As shown in FIG. 6A, the peripheral region 303 comprises a substrate 701 having a chip bonding region 305 and a fringe circuit region 307. Conductive layers 703a and 703b are disposed on the chip bonding region 305 and the fringe circuit region 307 respectively. An insulating layer 707 is formed on the substrate 701 between the conductive layer 703a and 703b and covers opposite sidewalls 703c thereof. The insulating layer 707 may be oxide or nitride. Referring to shown FIG. 6A, the insulating layer 707 also may cover part of the top surfaces of the conductive layers 703a and 703b. A conductive layer 708 is disposed on the insulating layer 707. In this embodiment, the conductive layers 703a, 703b and 708 may be the same or different materials. An insulating layer 710 is optionally formed on the conductive layer 708, having an opening exposing the top surface thereof. As shown in FIG. 6A, the insulating layer 710 is formed on the corners of the conductive layer 708. An insulating layer 711 is formed on the conductive layer 703b, spaced from the insulating layer 707. A conductive layer 709 is formed to cover the conductive layer 703a, the insulating layer 710, the conductive layer 708, and the exposed conductive layer 703b between the insulating layer 711 and 707, and part of the insulating layer 711, electrically connecting the chip bonding region 305 and the fringe circuit region 307. The conductive layer 709 may be a transparent conductive material, such as ITO, IZO, AZO, or CTO. In this embodiment, the cut region 705 may be within the insulating layer 707 between the opposite sidewalls 703c or within the insulating layer 711. The conductive layer 709 at the cut region 705 within the insulating layer 707 can be disposed with an opening exposing a top surface of the conductive layer 708. After cell process, the fringe circuit region 307 is removed by cutting through the cut region 705 within the insulating layer 707 or within the insulating layer 711, and irrespective of the cut region 705 is chosen, the insulating layer 707 protects the conductive layer 703a from corrosion.

Figure 6B:
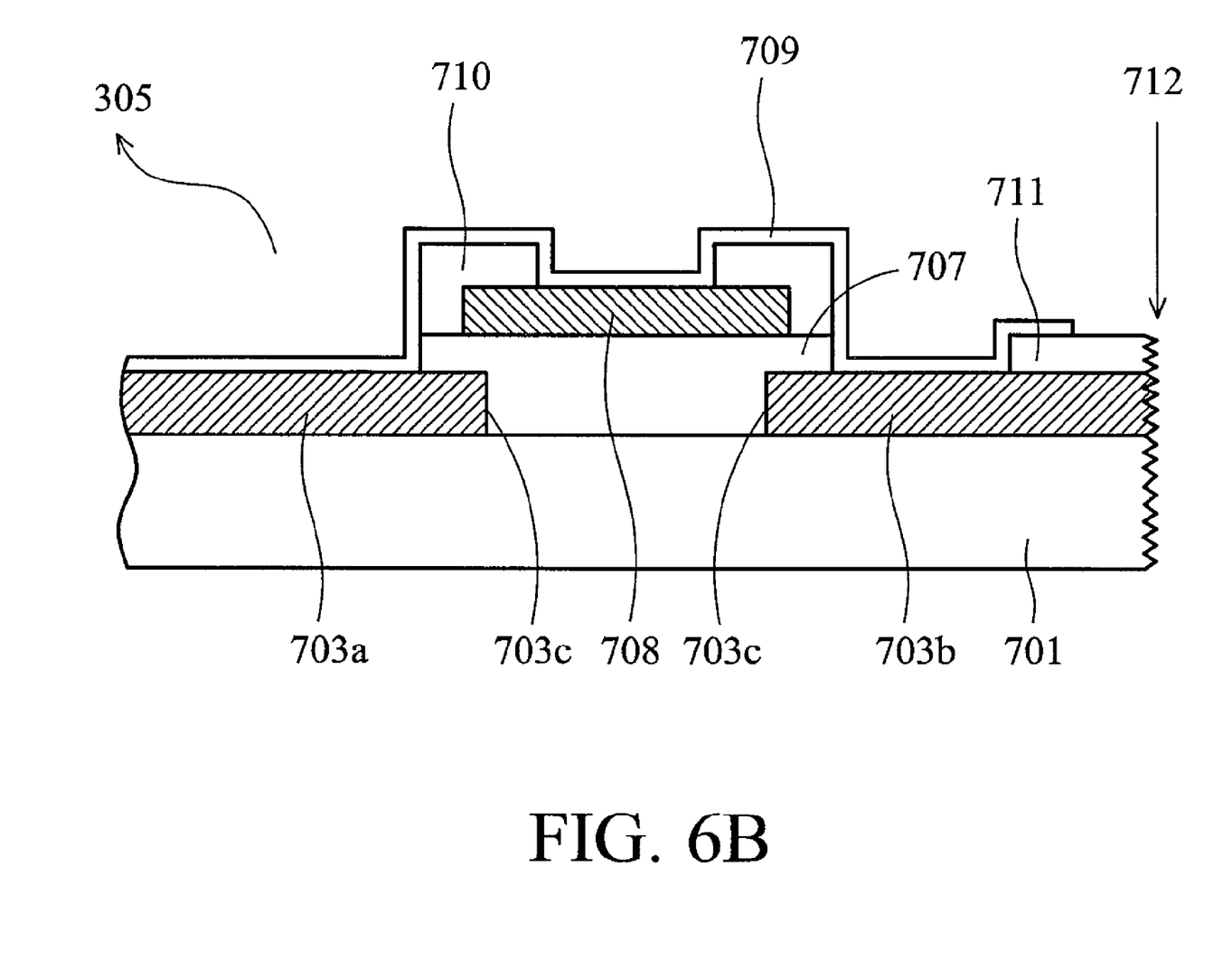
FIG. 6B is a cross-section of a peripheral region according to FIG. 6A after removal part of the fringe circuit region by cutting at one position.
Figure 6C:
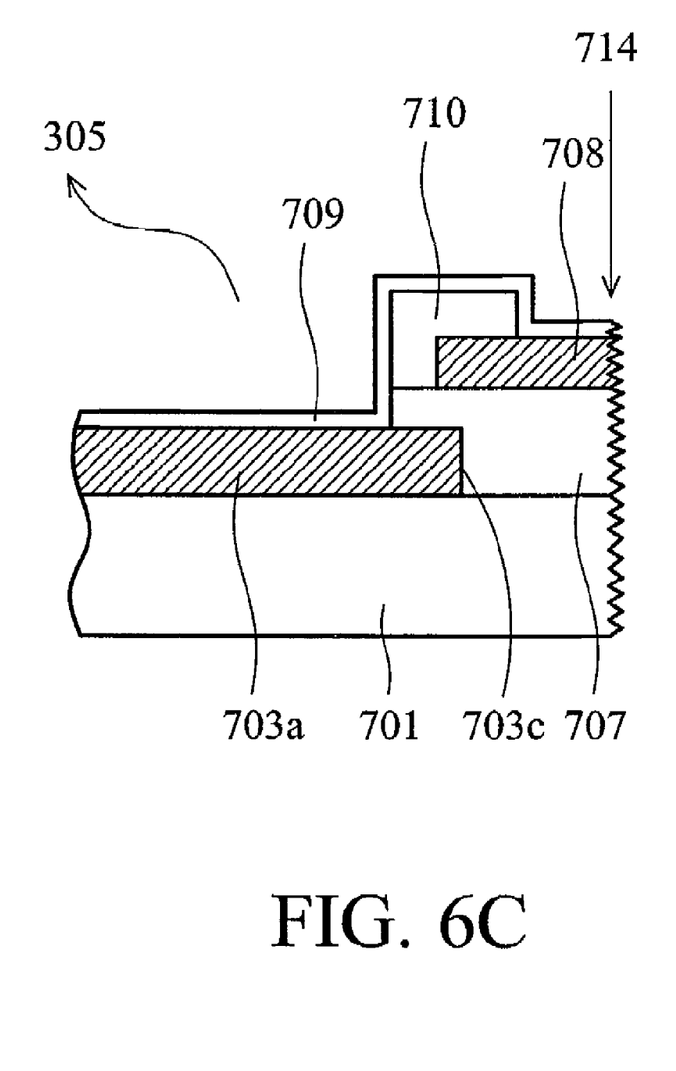
FIG. 6C is a cross-section of a peripheral region according to FIG. 6A after removal part of the fringe circuit region by cutting at the other position.

As shown in FIG. 6B, the cutting may be conducted on the cut region 705 within the insulating layer 711, producing a cut cross-section 712 along the boundary of the cut region 705 of FIG. 6A. As shown in FIG. 6C, the cutting may be conducted on the cut region 705 within the insulating layer 707, producing a cut cross-section 714 along the boundary of the cut region 705 of FIG. 6A.

Figure 7A:
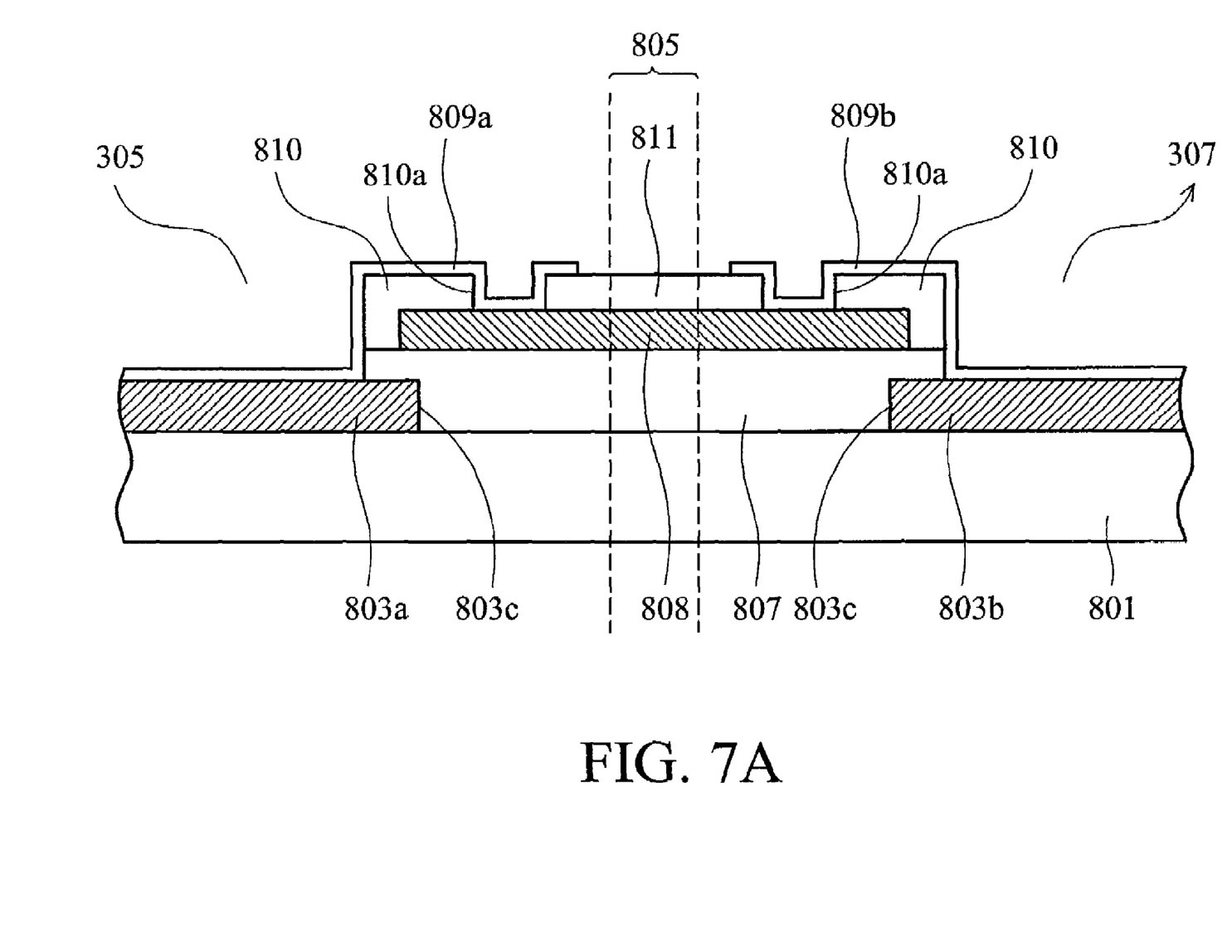
FIG. 7A is a cross-section of a peripheral region according to further another embodiment of the invention.
Figure 7B:
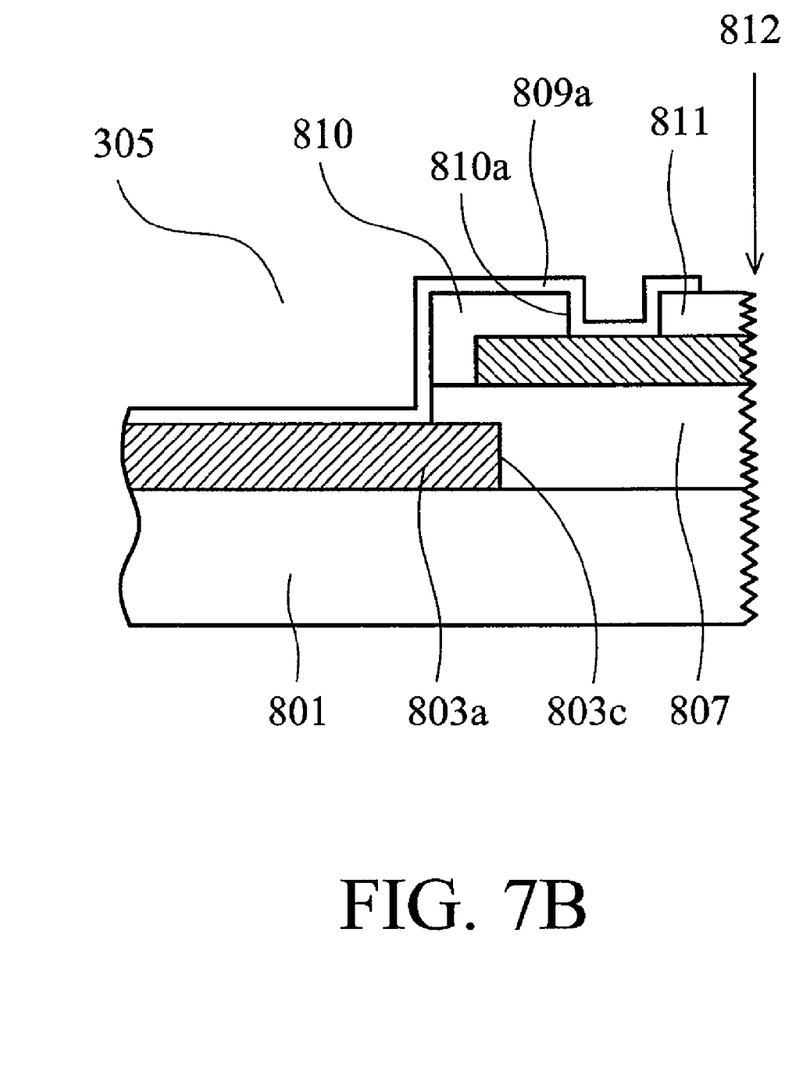
FIG. 7B is a cross-section of a peripheral region according to FIG. 7A after removal part of the fringe circuit region by cutting.

FIG. 7A shows a cross-section diagram of the peripheral region 303 according to yet another embodiment of the invention. As shown in FIG. 7A, the peripheral region 303 comprises a substrate 801 having a chip bonding region 305 and a fringe circuit region 307. Conductive layers 803a and 803b are disposed on the chip bonding region 305 and the fringe circuit region 307 respectively. An insulating layer 807 is formed on the substrate 801 between the conductive layers 803a and 803b and covers opposite sidewalls 803c thereof. The insulating layer 807 may be oxide or nitride. Referring to FIG. 7A, the insulating layer 807 also may cover part of the top surface of the conductive layer 803a and 803b, separating the conductive layer thereon from the conductive layer 803a and 803b. A conductive layer 808 is disposed on the insulating layer 807. An insulating layer 810 is formed on the conductive layer 808 with openings 810a exposing the top surfaces thereof. Two conductive layers 809a and 809b are then used to connect conductive layers 803a, 808, and 803b through the openings 810a. The conductive layer 809a is formed to cover the conductive layer 803a, the insulating layer 810, the exposed conductive layer 808, electrically connecting the conductive layers 803a and 808. The conductive layer 809b is formed to cover part of the insulating layer 811, the exposed conductive layer 808 and the conductive layer 803b. Note that the conductive 809a and 809b are spaced with the exposed portion of the insulating layer 811 serving later as a cut region. The conductive layer 809a and 809b may be a transparent conductive material, such as ITO, IZO, AZO, or CTO. By the formation of the conductive layers 809a and 809b, the chip bonding region 305 and the fringe circuit region 307 can be electrically connected. After cell process, the fringe circuit region 307 is removed by cutting through the cut region 805 within the insulating layer 811 and the conductive layer 803a can be protected by the insulating layer 807 from corrosion. As shown in FIG. 7B, the cutting through the cut region 805 within the insulating layer 811, producing a cut cross-section 812 along the boundary of the cut region 805 of FIG. 7A.

Finally, while the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A display panel, comprising:
   a substrate comprising a chip bonding region and a cut cross-section;
   a first conductive layer on the chip bonding region;
   a second conductive layer beside the chip bonding region extending until the cut cross-section;
   a first insulating layer on the substrate between the first and the second conductive layers covering a sidewall of the first conductive layer, and disposed on the second conductive layer extending until the cut cross-section, with an opening exposing a top surface thereof;
   a third conductive layer disposed over the first insulating layer and electrically connecting the first and second conductive layers;
   a fourth conductive layer disposed on the first insulating layer between the first and the second conductive layers, and under the third conductive layer; and
   a second insulating layer covering the fourth conductive layer, with an opening exposing a top surface of the fourth conductive layer, and under the third conductive layer,
   wherein the second conductive layer and the first conductive layer are disposed at the same side of the cut cross-section.

2. The display panel as claimed in claim 1, wherein the first insulating layer extends onto top surfaces of the first and the second conductive layers.

3. The display panel as claimed in claim 1, wherein the third conductive layer covers at least parts of the first and the second conductive layers.

4. The display panel as claimed in claim 1, wherein the first and the second conductive layers comprise Mo, Ti, Cr, W, Al, AlNd or MoW.

5. The display panel as claimed in claim 1, wherein the third conductive layer comprises ITO, IZO, AZO, or CTO.

6. The display panel as claimed in claim 1, wherein the first insulating layer comprises oxide or nitride.

7. The display panel as claimed in claim 1, wherein the third conductive layer electrically connects the first, second and fourth conductive layers.

8. The display panel as claimed in claim 1, wherein the fourth conductive layer comprises Mo, Ti, Cr, W, Al, AlNd or MoW.

9. The display panel as claimed in claim 1, wherein the second insulating layer comprises oxide or nitride.

10. A display panel, comprising:
    a substrate comprising a chip bonding region and a cut cross-section;
    a first conductive layer on the chip bonding region;
    a first insulating layer on the substrate between the first conductive layer and the cut cross-section, covering a sidewall of the first conductive layer;
    a second conductive layer on the first insulating layer extending until the cut cross-section;
    a second insulating layer covering the second conductive layer, with an opening exposing a top surface thereof; and
    a third conductive layer disposed on the second insulating layer and electrically connecting the first and second conductive layers,
    wherein the second conductive layer and the first conductive layer are disposed at the same side of the cut cross-section, and the first insulating layer extends onto a top surface of the first conductive layer.

11. The display panel as claimed in claim 10, wherein the third conductive layer extends until the cut cross-section.

12. The display panel as claimed in claim 10, wherein the second insulating layer extends until the cut cross-section.

13. The display panel as claimed in claim 10, wherein the third conductive layer covers at least parts of the first and second conductive layers.

14. The display panel as claimed in claim 10, wherein the first and second conductive layers comprise Mo, Ti, Cr, W, Al, AlNd or MoW.

15. The display panel as claimed in claim 10, wherein the first and second insulating layers comprise oxide or nitride.

16. The display panel as claimed in claim 10, wherein the third conductive layer comprises ITO, IZO, AZO, or CTO.

17. A display panel, comprising:
- a substrate comprising a chip bonding region and a cut cross-section;
- a first conductive layer on the chip bonding region;
- a second conductive layer beside the chip bonding region extending until the cut cross-section;
- a first insulating layer on the substrate between the first and the second conductive layers covering a sidewall of the first conductive layer, and disposed on the second conductive layer extending until the cut cross-section, with an opening exposing a top surface thereof;
- a third conductive layer disposed over the first insulating layer and electrically connecting the first and second conductive layers;
- a fourth conductive layer disposed on the first insulating layer between the first and the second conductive layers, and under the third conductive layer; and
- a second insulating layer covering the fourth conductive layer, with an opening exposing a top surface of the fourth conductive layer, and under the third conductive layer.

18. The display panel as claimed in claim 17, wherein the first insulating layer extends onto a top surface of the first conductive layer and a top surface of the second conductive layer.

19. The display panel as claimed in claim 17, wherein the third conductive layer covers at least parts of the first and the second conductive layers.

* * * * *